United States Patent
Kumagai et al.

(10) Patent No.: US 9,302,343 B2
(45) Date of Patent: Apr. 5, 2016

(54) PROCESS FOR SPOT-JOINING STACKED METAL FOILS

(71) Applicants: UACJ Corporation, Tokyo (JP); Kawasaki Jukogyo Kabushiki Kaisha, Kobe-Shi (JP); Obara Corporation, Fuefuki-Shi (JP)

(72) Inventors: Masaki Kumagai, Tokyo (JP); Hideki Okada, Kagamihara (JP); Arinobu Mori, Fuefuki (JP); Kenji Hayafuji, Fuefuki (JP)

(73) Assignees: UACJ Corporation, Tokyo (JP); Kawasaki Jukogyo Kabushiki Kaisha, Kobe-Shi (JP); Obara Corporation, Fuefuki-Shi (JP)

( * ) Notice: Subject to any disclaimer, the term of this patent is extended or adjusted under 35 U.S.C. 154(b) by 0 days.

(21) Appl. No.: 14/578,970

(22) Filed: Dec. 22, 2014

(65) Prior Publication Data
US 2015/0183053 A1 Jul. 2, 2015

(30) Foreign Application Priority Data
Dec. 27, 2013 (JP) .................................. 2013-271630

(51) Int. Cl.
*B23K 20/12* (2006.01)
(52) U.S. Cl.
CPC ............ *B23K 20/1265* (2013.01); *B23K 20/126* (2013.01)
(58) Field of Classification Search
None
See application file for complete search history.

(56) References Cited

U.S. PATENT DOCUMENTS

| | | | |
|---|---|---|---|
| 3,831,262 A * | 8/1974 | Luc | 228/110.1 |
| 2002/0179682 A1* | 12/2002 | Schilling et al. | 228/112.1 |
| 2003/0042291 A1* | 3/2003 | Mahoney | 228/112.1 |
| 2006/0289604 A1* | 12/2006 | Zettler et al. | 228/2.1 |
| 2007/0187469 A1* | 8/2007 | Chen et al. | 228/112.1 |
| 2008/0006677 A1* | 1/2008 | Kumagai et al. | 228/101 |
| 2008/0029581 A1* | 2/2008 | Kumagai et al. | 228/101 |
| 2008/0067215 A1* | 3/2008 | Gendou | 228/112.1 |
| 2008/0173696 A1* | 7/2008 | Gendou et al. | 228/112.1 |
| 2014/0069985 A1* | 3/2014 | Okada et al. | 228/112.1 |
| 2015/0202711 A1* | 7/2015 | Jin | |

FOREIGN PATENT DOCUMENTS

| | | | | |
|---|---|---|---|---|
| EP | 1902810 A1 * | 3/2008 | ............ | B23K 20/12 |
| JP | 2001259863 A * | 9/2001 | ............ | B23K 20/12 |
| JP | 2002120076 A * | 4/2002 | ............ | B23K 20/12 |
| JP | 2003-126972 A1 | 5/2003 | | |
| JP | 2005-103586 A1 | 4/2005 | | |

(Continued)

*Primary Examiner* — Kiley Stoner
(74) *Attorney, Agent, or Firm* — Burr & Brown, PLLC (57) ABSTRACT

Friction stir spot-welding is performed to join together a stack of a plurality of metal foils and a metal sheet by using a double-acting type rotary tool including a hollow member and a pin member which are movable independently of each other in their axial directions, and a clamp member which is fitted on an outer circumferential surface of the hollow member and which is movable in its axial direction. While an outer annular part of a portion to be friction-stirred is pressed with the clamp member, the pin member is inserted into the above-described portion and the hollow member is retracted, whereby a metal mass is accommodated within a space formed between the above-described portion and the hollow member. Then, the hollow member is advanced to press the metal mass into a hole formed by retraction of the pin member, whereby the hole is filled with the metal mass.

8 Claims, 7 Drawing Sheets

(56) References Cited

FOREIGN PATENT DOCUMENTS

| JP | 2005199334 | A | * | 7/2005 | ............ | B23K 20/12 |
| JP | 2005288465 | A | * | 10/2005 | ............ | B23K 20/12 |
| JP | 2006167793 | A | * | 6/2006 | | |
| JP | 2006212651 | A | * | 8/2006 | | |
| JP | 2006320924 | A | * | 11/2006 | | |
| JP | 2007000880 | A | * | 1/2007 | | |
| JP | 2008073693 | A | * | 4/2008 | | |
| JP | 2009241085 | A | * | 10/2009 | | |
| JP | 4577620 | B2 | * | 11/2010 | | |
| JP | 2012196680 | A | * | 10/2012 | | |
| JP | 2012196682 | A | * | 10/2012 | | |
| JP | 5685461 | B2 | * | 3/2015 | | |

* cited by examiner

PROCESS FOR SPOT-JOINING STACKED METAL FOILS

The present application is based on Japanese Patent Application No. 2013-271630 filed on Dec. 27, 2013 the contents of which are incorporated herein by reference.

BACKGROUND OF THE INVENTION

1. Field of the Invention

The present invention relates generally to a process for spot-joining stacked metal foils, and more particularly to a process for performing a friction stir spot-welding operation to advantageously realize electrical and mechanical integral joining of a plurality of metal foils stacked or superposed on each other, by using a double-acting type rotary tool.

2. Discussion of Related Art

Metal foils such as aluminum foils and copper foils, which have high electric conductivity, have been used as an electrode such as a current collector of a battery, in a form wherein a plurality of metal foils are stacked or superposed on each other. In a stack of the metal foils which are superposed on each other and which function as the electrode, it is required that the metal foils are fixed together in direct contact with each other, so that the metal foils are electrically and mechanically joined as a unit.

As a conventional process for joining the metal foils stacked on each other as described above, a process using ultrasonic waves has been generally employed. However, a joint strength achieved by this process is undesirably low, giving rise to a problem of failure to achieve stable joining, so that there is a risk of delamination of the stack of the metal foils, due to thermal expansion during charging and discharging of a battery, for example. As a process which solves this problem, a joining process using a friction stir welding operation as a solid-state welding operation has been proposed. Examples of such a process are disclosed in JP-A-2003-126972 and JP-A-2005-103586.

In the process disclosed in JP-A-2003-126972, the friction stir welding operation is performed in an arrangement wherein metal plates having larger thicknesses than metal foils are superposed on respective opposite surfaces of a stack of a plurality of metal foils such that the stack of the metal foils is interposed between the metal plates. In this process, the friction stir welding operation is intended to be performed by using a fixed type tool (rotary tool) with a structure wherein a pin having a predetermined length is provided integrally with a distal end of a cylindrical body which is rotatable about its axis. Accordingly, where a spot-joining operation is performed, a tool hole such as a pin hole (probe hole) is formed and left in a weld due to removal of the welding tool after the welding operation. The existence of the tool hole results in deterioration of the joint strength, so that in JP-A-2003-126972, a linear-joining operation is performed rather than the spot-joining operation, in order to avoid the deterioration of the joint strength. However, where the linear-joining operation is performed, there is a risk that the stacked metal foils are displaced relative to each other due to a movement of the welding tool during the welding operation, unless the metal foils are very firmly fixed together. In order to avoid such a risk, there has been proposed a process in which the metal foils are fixed together by using a bonding agent, but addition of a step of bonding together the metal foils with the bonding agent inevitably results in undesirable increases of a workload and a cost.

On the other hand, JP-A-2005-103586 discloses a process for joining a collective body of a plurality of metal foils by the friction stir welding operation. In this process, the friction stir welding operation is performed while the collective body is fixed by swaging or caulking with a pressure applied in opposite directions perpendicular to upper and lower surfaces of the collective body, or by temporary joining of the collective body by ultrasonic wave welding, cold welding or arc welding. Alternatively, the friction stir welding operation is performed while a reinforcement substrate made of the same metal as the collective body is held in abutting contact with the collective body. However, in this process, too, the linear-joining operation is intended to be performed by using the fixed type tool (rotary tool), so that this process also has the inherent problem as described above with respect to the process of JP-A-2003-126972.

SUMMARY OF THE INVENTION

This invention was made in view of the background art described above. Therefore, it is an object of the invention to provide a process for spot-joining a plurality of metal foils superposed on each other, by performing a friction stir spot-welding operation, which process makes it possible to advantageously form a weld having a sound state of joining.

The above-described object of the invention can be achieved according to a principle of the invention, which provides a process for spot-joining stacked metal foils by a friction stir spot-welding operation wherein a stack of a plurality of metal foils superposed on each other is placed on a lower metal sheet, and a rotary tool rotated about its axis is inserted through the stack into the lower metal sheet, whereby the stack and the lower metal sheet are friction-stirred and joined integrally with each other, characterized in that: the rotary tool is a double-acting type rotary tool comprising: a hollow member which has an end face perpendicular to its axis and which is movable in its axial direction; and a pin member which is disposed coaxially within the hollow member, formed independently of the hollow member, and movable in its axial direction independently of the hollow member; a cylindrical clamp member which is movable in its axial direction is fitted on an outer circumferential surface of the hollow member so as to be coaxial with the hollow member; the friction stir spot-welding operation is performed by holding the clamp member in pressing contact with an outer annular part of a portion to be friction-stirred, and advancing either one of the hollow member and the pin member of the double-acting type rotary tool into the portion to be friction-stirred, while retracting the other of the hollow member and the pin member, so that a space is formed between the portion to be friction-stirred and the other of the hollow member and the pin member, whereby a metal mass is generated by insertion of the one of the hollow member and the pin member into the portion to be friction-stirred, and is accommodated within the above-described space; and subsequently to the friction stir spot-welding operation, the other of the hollow member and the pin member is advanced, while the one of the hollow member and the pin member is retracted, so that the metal mass accommodated within the above-described space is pressed by the other of the hollow member and the pin member, into a hole formed by retraction of the one of the hollow member and the pin member, whereby the hole is filled with the metal mass.

According to a preferable form of the invention, after a portion of the stack to be friction-stirred is fixed with the clamp member which is held in pressing contact with an outer annular part of the above-described portion of the stack, the hollow member and the pin member of the double-acting type rotary tool are brought into contact with the above-described portion of the stack to be friction-stirred, while end faces of the hollow member and the pin member are held flush with each other, and then, the above-described one of the hollow member and the pin member is advanced and the above-described other of the hollow member and the pin member is retracted, simultaneously with each other.

According to another preferable form of the invention, an upper metal sheet is superposed on the stack, and the friction stir spot-welding operation is performed by inserting the rotary tool through the upper metal sheet and through the stack into the lower metal sheet, to join together the stack and the upper and lower metal sheets.

According to a still another preferable form of the invention, in the case where the friction stir spot-welding operation is performed in an arrangement wherein the upper and lower metal sheets are respectively disposed on the upper and lower sides of the stack, while end faces of the hollow member, the pin member and the clamp member are held flush with each other, the hollow member and the pin member of the double-acting type rotary tool are brought into contact with a portion of the upper metal sheet corresponding to a portion of the stack to be friction-stirred, and the clamp member is brought into contact with an outer annular part of the above-described portion of the upper metal sheet, and then, the above-described one of the hollow member and the pin member is advanced and the above-described other of the hollow member and the pin member is retracted, simultaneously with each other, while the above-described portion of the upper metal sheet is fixed with the clamp member which is held in pressing contact with the outer annular part of the above-described portion of the upper metal sheet.

According to a yet another preferable form of the invention, the friction stir spot-welding operation is performed so as to satisfy formulas $0.01 \leq a \leq 0.75 \times b$, and $0.2\ b$, in which "a" (mm) is a depth of insertion of the above-described one of the hollow member and the pin member into the lower metal sheet, and "b" (mm) is a thickness of the lower metal sheet.

According to a further preferable form of the invention, the metal foils are aluminum foils or copper foils.

According to another preferable form of the invention, the lower metal sheet has a thickness of 0.2-3 mm.

According to still another preferable form of the invention, the upper metal sheet has a thickness of 0.1-1 mm.

In the process for spot-joining stacked metal foils according to the invention, the friction stir spot-welding operation is performed by using the double-acting type rotary tool which makes it possible to prevent the tool hole such as the pin hole from being left after removal of the rotary tool. Further, the cylindrical clamp member which is movable in its axial direction is fitted on the outer circumferential surface of the hollow member of the double-acting type rotary tool so as to be coaxial with the hollow member, and the friction stir spot-welding operation is performed while the outer annular part of the portion to be friction-stirred is pressure-held with the clamp member. In the process according to the invention, the metal mass generated during the friction stir spot-welding operation is pressed into the hole formed by retraction of the hollow member or the pin member of the double-acting type rotary tool, so that the hole is filled with the metal mass. Therefore, not only problems such as the deterioration of the joint strength do not take place, which problems would otherwise be caused by the hole (tool hole) left after removal of the rotary tool, but also soundness of the obtained weld can be advantageously improved, whereby an electrically and mechanically sound state of joining can be realized.

Further, in the present invention, the outer annular part of the portion to be friction-stirred is pressure-held with the clamp member which is fitted on the outer circumferential surface of the double-acting type rotary tool (hollow member) and which is not rotated about its axis. Thus, an outermost one of the metal foils superposed on each other is pressure-held with the clamp member, so that even though the friction stir spot-welding operation is performed directly on the stack of the metal foils, the spot-joining operation can be performed while effectively restricting or preventing problems that the metal foils constituting the stack are torn or displaced relative to each other, for example.

BRIEF DESCRIPTION OF THE DRAWINGS

FIGS. 2(a)-(d) are cross sectional views schematically showing first half steps of the process according to the invention initiated in the arrangement shown in FIG. 1, in which FIGS. 2(a)-(d) show the respective steps performed according to a first embodiment of the invention;

FIGS. 3(a)-(c) are cross sectional views schematically showing second half steps which follow the steps shown in FIGS. 2(a)-(d), in which FIGS. 3(a)-(c) show the respective steps performed according to the first embodiment of the invention;

DETAILED DESCRIPTION OF THE INVENTION

To clarify the invention more specifically, typical embodiments of the invention will be described in detail by reference to the drawings.

Figure 1:
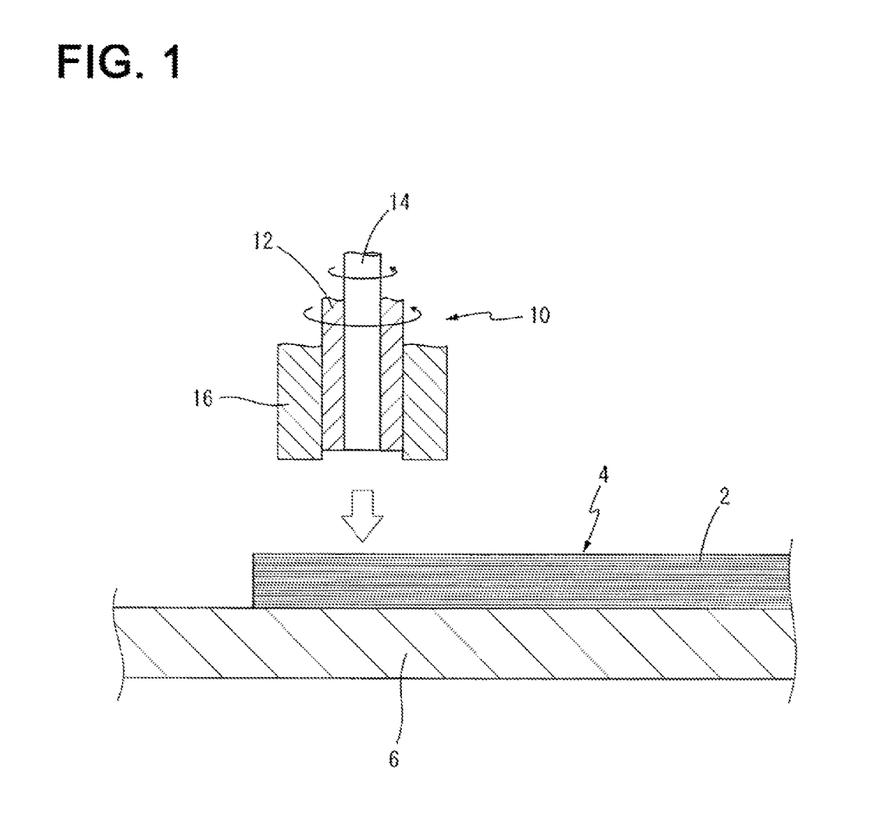
FIG. 1 is a longitudinal cross sectional view schematically showing an example of an arrangement before a process for spot-joining stacked metal foils according to the invention is performed.

Referring first to FIG. 1, there is shown an arrangement for spot-joining stacked metal foils according to the invention. In this arrangement, a stack 4 of a plurality of desired metal foils 2 superposed on each other and a lower metal sheet 6 on which the stack 4 is placed are held on a predetermined support base (not shown), and a double-acting type rotary tool 10 is disposed above the stack 4.

In the above-described arrangement, a friction stir spot-welding operation is performed on the stack 4 and the lower metal sheet 6 by using the double-acting type rotary tool 10. A material of the plurality of metal foils 2 constituting the stack 4 is suitably selected depending on an application of a product to be obtained by the friction stir spot-welding operation. For example, aluminum foils or copper foils are suitably used as the metal foils 2, for an application requiring a high degree of electric conductivity of the metal foils 2. Specific examples of aluminum materials for the aluminum foils preferably used in the invention include 1000 series aluminum alloy materials according to JIS (Japanese Industrial Standards) such as JIS A1050 and JIS A1200, 3000 series aluminum alloy materials according to JIS such as JIS A3003, and 8000 series aluminum alloy materials according to JIS such as JIS A8021 and JIS A8079. In the case where the copper foils are used as the metal foils 2, the metal foils 2 are preferably formed from rolled copper foils made of tough pitch copper (TPC), oxygen-free copper (OFC) and the like. A thickness of each of the plurality of metal foils 2 is suitably selected depending on the application of the product to be obtained by the friction stir spot-welding operation. The thickness of each metal foil 2 is generally within a range between about 3 μm and about 50 μm, and preferably within a range between about 5 μm and about 15 μm. Further, a number of the plurality of metal foils 2 constituting the stack 4 is suitably selected depending on the application of the intended product. The number of the plurality of metal foils 2 constituting the stack 4 is generally from about 10 to about 100, and preferably from about 20 to about 50.

It is preferable that the metal sheet 6 on which the stack 4 is placed is made of the same material as that of the metal foils 2 described above, for the application requiring a high degree of electric conductivity of the metal foils 2, but for other applications, the metal sheet 6 may be made of a material different from that of the metal foils 2. A thickness of the metal sheet 6 is suitably determined so as to be large enough to permit sound fixing of the stack 4, but generally, it is advantageous that the metal sheet 6 has a thickness of not smaller than 0.2 mm. A permissible maximum thickness of the metal sheet 6 is not particularly limited and is suitably determined depending on the application. However, in the case where the metal sheet 6 is used as an electrode, an extremely large thickness is not preferred in view of electric conductivity, so that the metal sheet 6 preferably has a thickness of not larger than 3 mm.

The double-acting type rotary tool 10 is configured to perform the friction stir spot-welding operation so as to form an integral weld which penetrates through the stack 4 of the plurality of metal foils 2 and reaches the lower metal sheet 6. The double-acting type rotary tool 10 includes: a hollow member (or also called shoulder member) 12 in the form of a hollow cylinder whose lower end face is perpendicular to its axis, and which is movable in its axial direction and rotatable about its axis; and a pin member (or also called probe) 14 in the form of a solid cylinder which is coaxially disposed within the hollow member 12, formed independently of the hollow member 12, and movable in its axial direction and rotatable about its axis, independently of the hollow member 12. Examples of the double-acting type rotary tool 10 constructed as described above are disclosed in Japanese Patent No. 3709972, JP-A-2012-196680, JP-A-2012-196681 and JP-A-2012-196682. In this invention, the double-acting type rotary tool having a known structure is adequately used. Further, a clamp member 16 in the form of a hollow cylinder is fitted on an outer circumferential surface of the hollow member 12 so as to be coaxial with the hollow member 12. The clamp member 16 is movable in its axial direction, and is not rotatable about its axis.

Figure 2A:
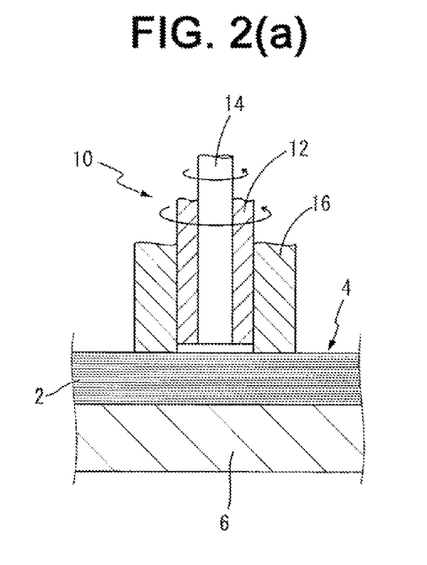
Figure 2B:
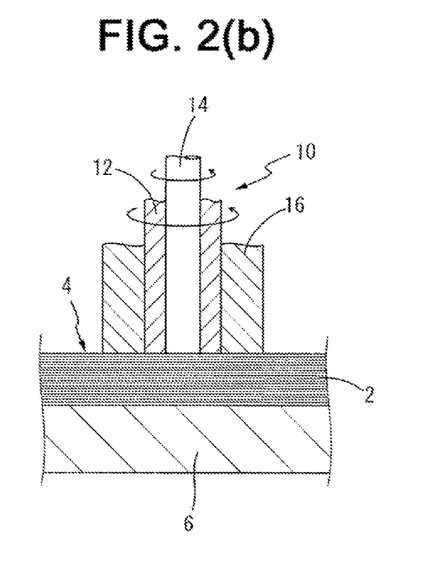

In a first embodiment of a process for spot-joining stacked metal foils according to the invention, the friction stir spot-welding operation is initiated in the arrangement shown in FIG. 1, and includes the steps shown in FIGS. 2(a)-(d). Namely, the clamp member 16 is initially moved downwards into pressing contact with an upper surface of the stack 4 of the metal foils 2, as shown in FIG. 2(a), to press an outer annular part of a portion of the stack 4 to be friction-stirred, whereby the stack 4 is firmly held in place. In this respect, it is noted that the portion of the stack 4 to be friction-stirred includes an area corresponding to a lower end face of the rotary tool 10. Then, while the stack 4 is pressure-held with the clamp member 16 as described above, the hollow member 12 and the pin member 14 of the double-acting type rotary tool 10 are moved downwards in their axial directions, while the hollow member 12 and the pin member 14 are rotated about their axes and their lower end faces are held flush with each other, until these lower end faces contact the upper surface of the stack 4, as shown in FIG. 2(b).

Figure 2C:
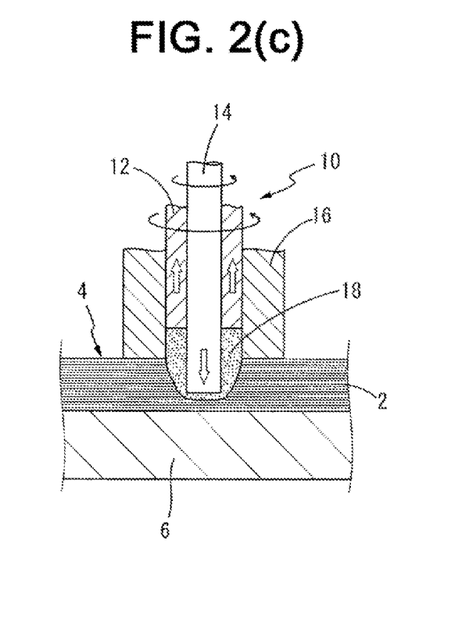
Figure 2D:
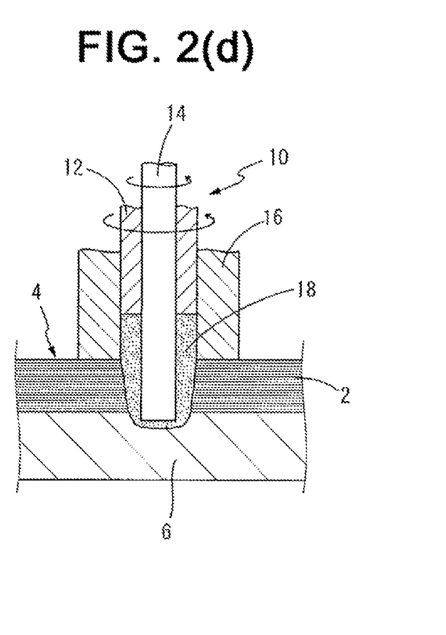

After the entire lower end face of the rotary tool 10 is brought into contact with the upper surface of the stack 4, and friction heat is generated over the entire area of the portion of the stack 4 to be friction-stirred, the pin member 14 is further moved (advanced) downwards into the portion of the stack 4 to be friction-stirred, as shown in FIG. 2(c), to friction-stir the stack 4 and join together the plurality of metal foils 2 superposed on each other. Meanwhile, the hollow member 12 is gradually moved (retracted) upwards in its axial direction, so that a space is formed between the portion of the stack 4 being friction-stirred and the hollow member 12, whereby a metal mass 18 generated by insertion of the pin member 14 into the stack 4 is accommodated within the above-described space during the friction stir spot-welding operation. The friction stir spot-welding operation is performed until the pin member 14 reaches the lower metal sheet 6 and is inserted into the lower metal sheet 6 by a predetermined depth, as shown in FIG. 2(d). The above-described downward movement of the pin member 14 and upward movement of the hollow member 12 are terminated when a sufficient degree of joining is assured between the stack 4 and the lower metal sheet 6.

Figure 3A:
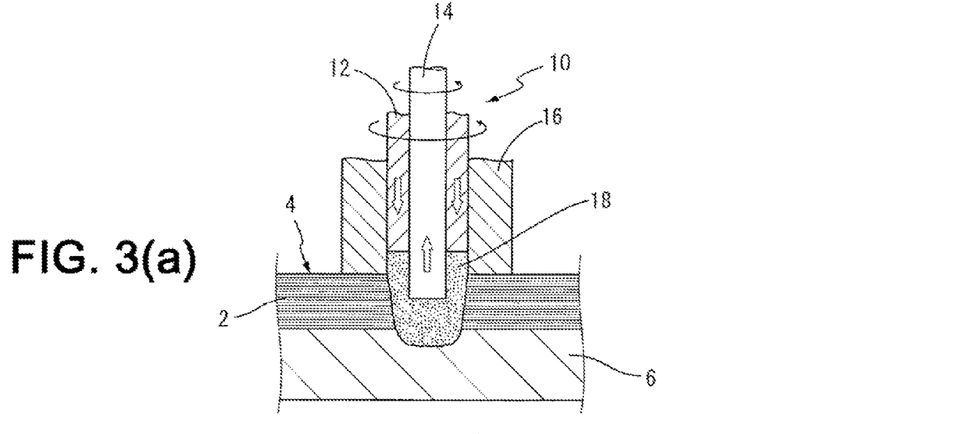
Figure 3B:
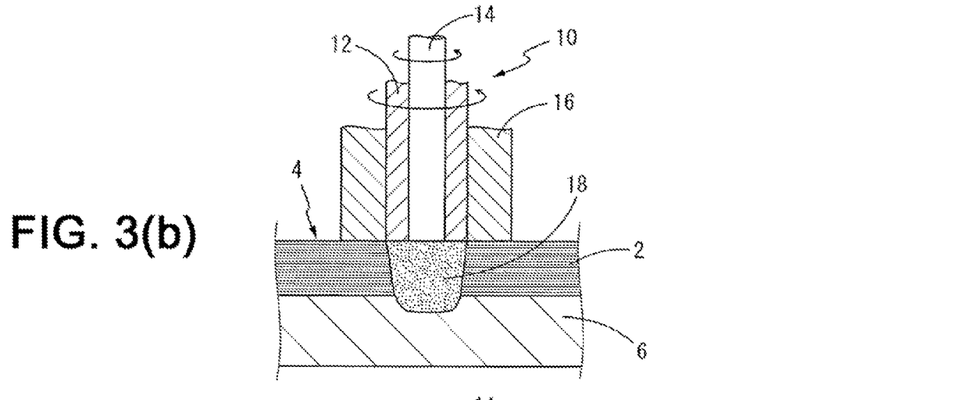
Figure 3C:
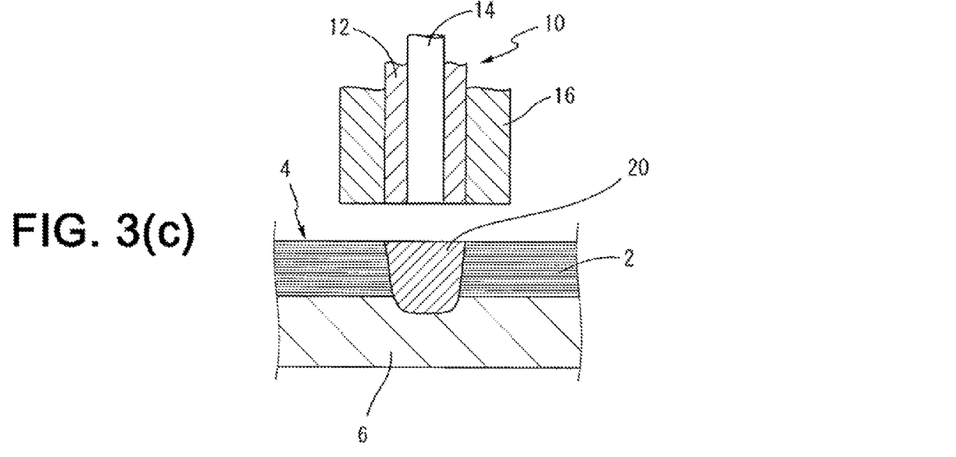

Then, in the arrangement shown in FIG. 2(d), the pin member 14 and the hollow member 12 are moved in respective directions opposite to the directions of their movements described above, namely, the pin member 14 is moved (retracted) upwards and the hollow member 12 is moved (advanced) downwards, as shown in FIG. 3(a), whereby the metal mass 18 is pressed by the lower end face of the hollow member 12 into a hole formed by the upward movement of the pin member 14. Namely, the metal mass 18 accommodated within the space formed by the upward movement of the hollow member 12 is pressed by the downward movement of the hollow member 12 into the hole formed by the upward movement of the pin member 14, so that the hole is filled with the metal mass 18 and effectively prevented from being left after retraction of the pin member 14, and the metal mass 18 is given a flat upper surface, as shown in FIG. 3(b). Then, the double-acting type rotary tool 10 and the clamp member 16 are moved upwards and removed from the stack 4, whereby a joined body consisting of the stack 4 and the lower metal sheet 6 and including a weld 20 with the flat upper surface is obtained, as shown in FIG. 3(c).

According to the above-described process for spot-joining the stacked metal foils by the friction stir spot-welding operation, the hollow member 12 is moved downwards when the pin member 14 inserted through the stack 4 into the lower metal sheet 6 is retracted therefrom, so that the metal mass 18 generated during the friction stir spot-welding operation and accommodated within the space formed by the upward movement of the hollow member 12 is pressed by the downward movement of the hollow member 12 into the hole formed by retraction of the pin member 14, and the hole is filled with the metal mass 18. Therefore, the weld 20 formed by the friction stir spot-welding operation has the flat upper surface, without the hole which would otherwise be left after retraction of the pin member 14. Thus, the sound weld 20 can be formed by the friction stir spot-welding operation without causing problems such as deterioration of joint strength, and assuring a sound state of joining among the metal foils 2 of the stack 4 and a sound state of joining between the stack 4 and the lower metal sheet 6.

Figure 4:
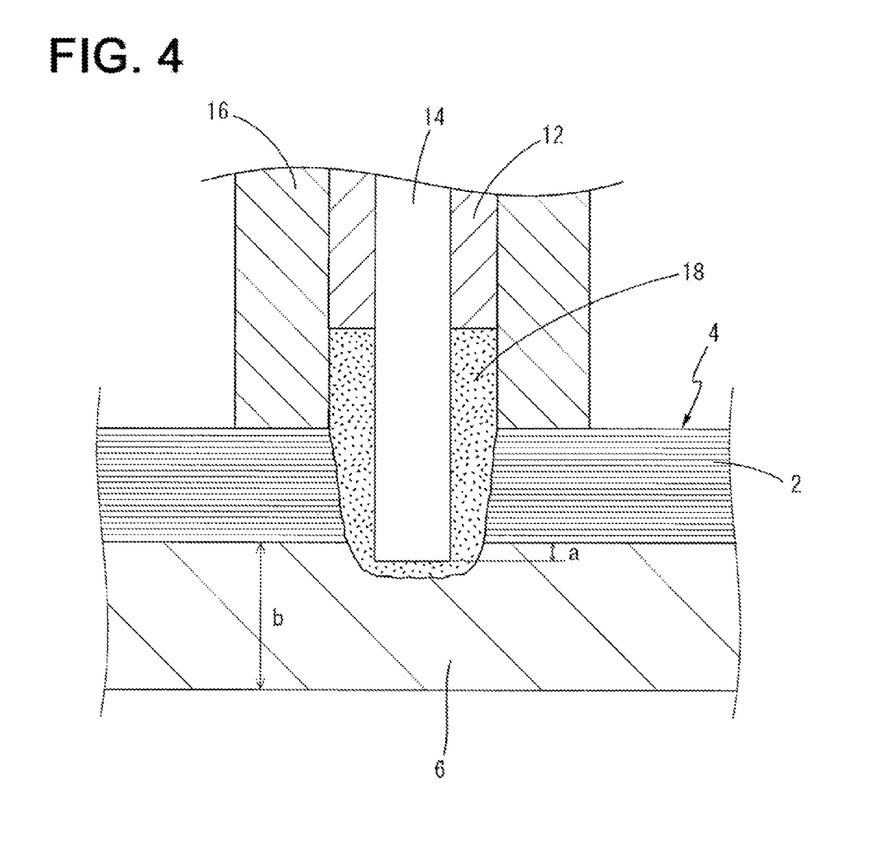
FIG. 4 is an enlarged cross sectional view schematically showing an arrangement wherein a double-acting type rotary tool according to the invention is lowered until the tool reaches a metal sheet on which a stack of the metal foils is placed, to effect friction-stirring.

Particularly, more sound spot-joining can be realized by performing the friction stir spot-welding operation so as to satisfy formulas: $0.01 \leq a \leq 0.75 \times b$, and $0.2 \leq b$, where "a" (mm) is the depth of insertion (penetration) of the pin member 14 into the lower metal sheet 6, and "b" (mm) is the thickness of the lower metal sheet 6. In the case where the depth "a" is smaller than 0.01 mm, the insertion depth of the pin member 14 into the lower metal sheet 6 is excessively small, so that there arises a risk of delamination of the lower metal sheet 6 from the lowermost one of the metal foils 2 and the stack 4. On the other hand, where the depth "a" is larger than 0.75 times the thickness (b) of the lower metal sheet 6, the insertion depth of the pin member 14 into the lower metal sheet 6 is excessively large, so that there arises a risk of deformation of the lower metal sheet 6, for example.

Further, the friction stir spot-welding operation is initiated in the state wherein the stack 4 is pressure-held with the clamp member 16 which is not rotated and held in direct contact with the uppermost one of the metal foils 2 of the stack 4, as shown in FIGS. 2(a)-(d). By holding the stack 4 between the clamp member 16 and the lower metal sheet 6, the friction stir spot-welding operation can be advantageously performed while effectively restricting occurrence of problems such as tearing of the metal foils 2 located in an upper portion of the stack 4, even though the friction stir spot-welding operation is performed directly on the stack 4.

Moreover, in the friction stir spot-welding operation, the hollow member 12 and the pin member 14 of the double-acting type rotary tool 10 are simultaneously moved downwards while their lower end faces are held flush with each other, and these lower end faces are brought into contact with the upper surface of the stack 4 to generate the friction heat, as shown in FIGS. 2(a) and 2(b). Then, the pin member 14 and the hollow member 12 are respectively moved downwards and upwards simultaneously with each other. Accordingly, an effect of friction-stirring can be effectively exercised on the metal foils 2 located in the upper portion of the stack 4 over the entire area of the portion of the stack 4 to be friction-stirred, so that it is possible to effectively restrict or prevent occurrence of problems that the metal foils 2 are moved upwards or torn due to insertion of the pin member 14 into the metal foils 2, for example.

In the above-described embodiment, the pin member 14 is inserted through the stack 4 into the lower metal sheet 6. Alternatively, it is possible to perform the friction stir spot-welding operation according to the invention by downwardly moving the hollow member 12 so that the hollow member 12 is inserted through the stack 4 into the lower metal sheet 6, while upwardly moving the pin member 14 so that the metal mass 18 generated by the friction-stirring operation with the hollow member 12 is accommodated within a space formed by the upward movement of the pin member 14, as shown in FIG. 5.

Figure 5:
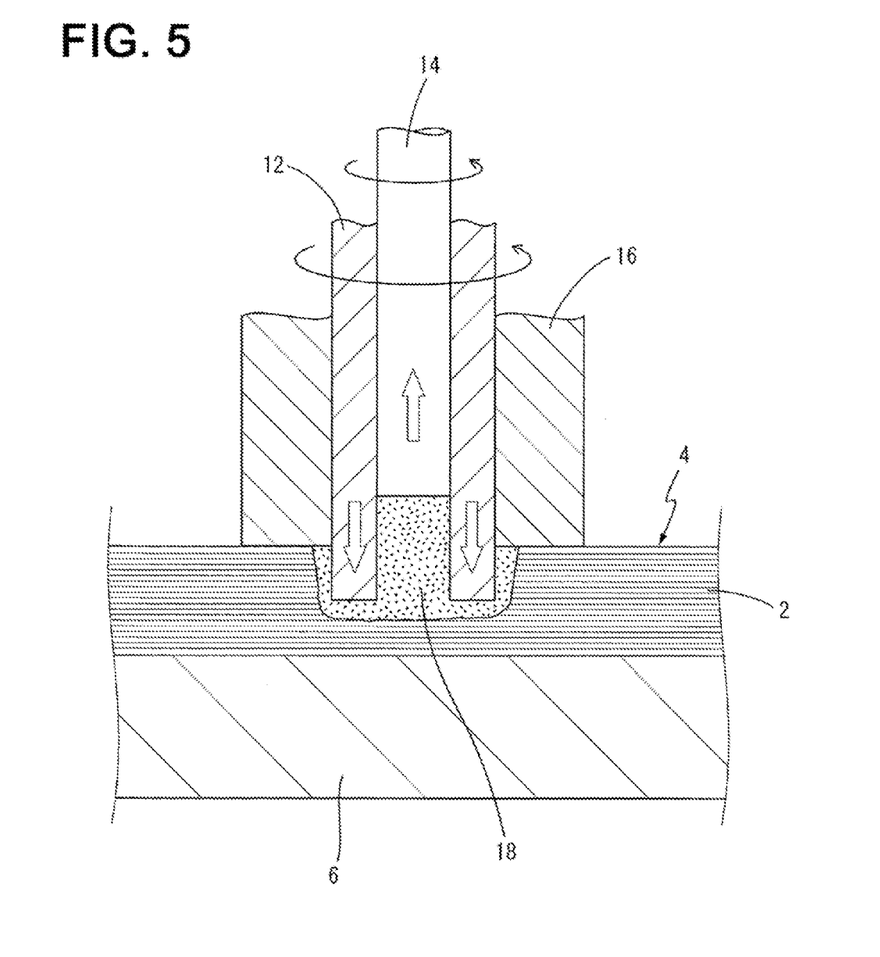
FIG. 5 is an enlarged cross sectional view schematically showing a way of driving the double-acting type rotary tool, according to a second embodiment of the process of the invention.

In the friction stir spot-welding operation shown in FIG. 5, the hollow member 12 and the pin member 14 are moved in respective directions opposite to the directions of their movements in the friction stir spot-welding operation shown in FIGS. 2(a)-(d) and 3(a)-(c) described above, whereby substantially the same operational and physical advantages as achieved in the above-described first embodiment can be achieved in this embodiment. A depth "a" of insertion of the hollow member 12 into the lower metal sheet 6 is preferably determined so as to satisfy the same relationship between the insertion depth "a" of the pin member 14 into the lower metal sheet 6 and the thickness "b" of the lower metal sheet 6 as described above by reference to FIG. 4, whereby the sound weld 20 can be formed by the friction stir spot-welding operation.

In the present invention, the friction stir spot-welding operation shown in FIGS. 2(a)-(d) and 3(a)-(c) may be performed by placing an upper metal sheet 8 on the stack 4 superposed on the lower metal sheet 6, as shown in FIGS. 6(a)-(d) and 7(a)-(c), so that the stack 4 is pressure-held between the lower metal sheet 6 and the upper metal sheet 8. A thickness of the upper metal sheet 8 is not particularly limited, but is generally held within a range between about 0.1 mm and about 1 mm, in order to permit sound fixing of the stack 4 and insertion of the hollow member 12 or the pin member 14 of the double-acting type rotary tool 10 through the upper metal sheet 8 and through the stack 4 into the lower metal sheet 6.

Figure 6A:
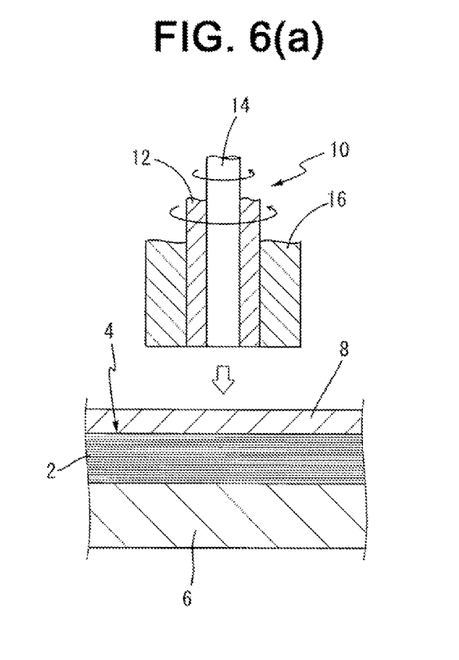
FIGS. 6(a)-(d) are schematic views showing first half steps performed according to a third embodiment of the invention alternative to the embodiment shown in FIGS. 2(a)-(d) and 3(a)-(c), which steps correspond to the respective steps shown in FIGS. 2(a)-(d)
Figure 6B:
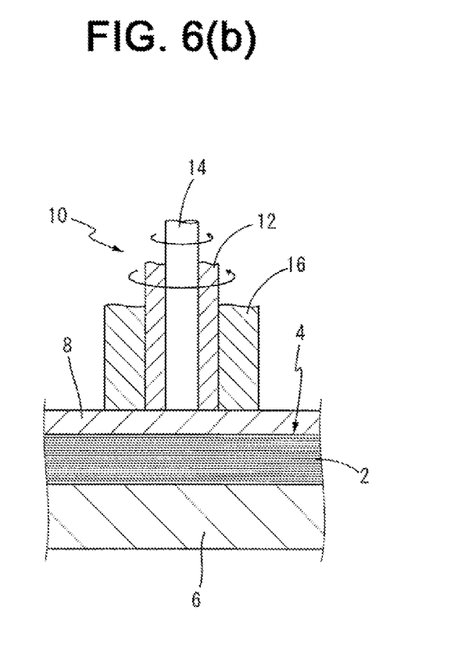
Figure 6C:
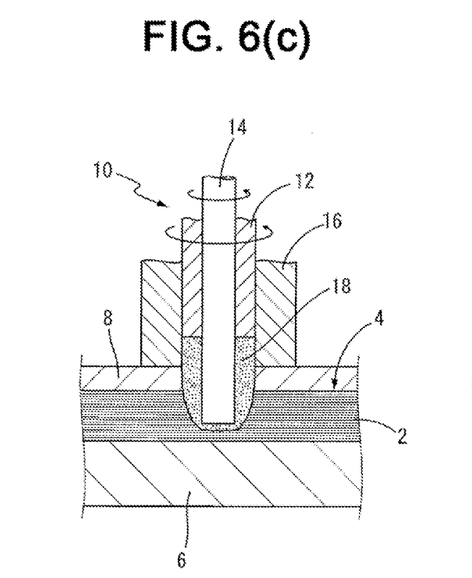
Figure 6D:
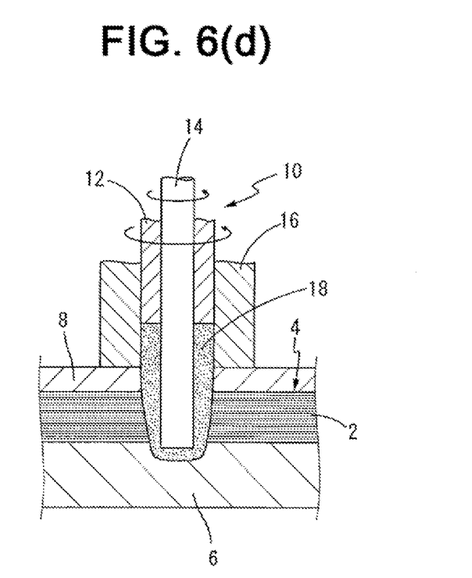
Figure 7A:
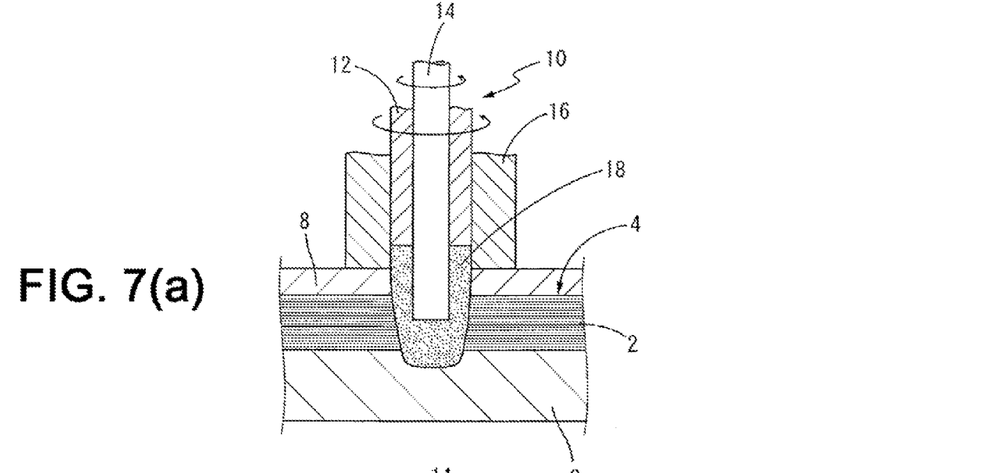
FIGS. 7(a)-(c) are cross sectional views corresponding to FIGS. 3(a)-(c), and schematically showing second half steps which follow the steps shown in FIGS. 6(a)-(d).
Figure 7B:
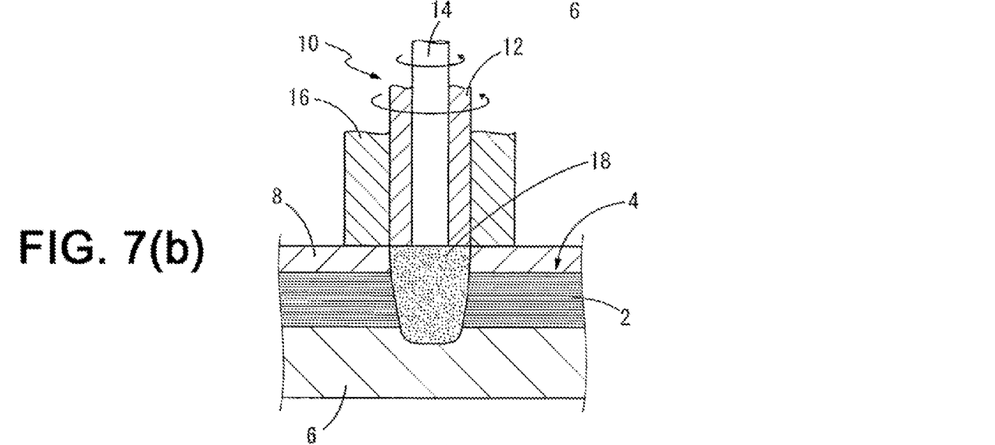
Figure 7C:
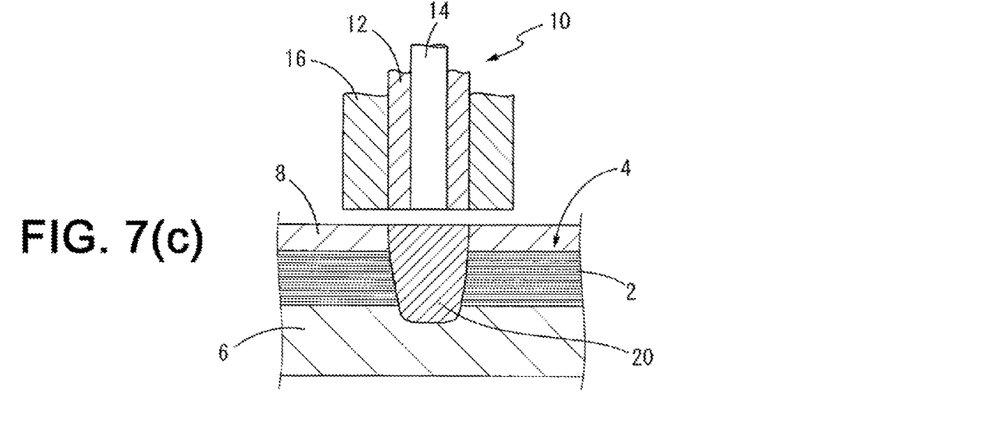

Specifically described, while the hollow member 12 and the pin member 14 of the double-acting type rotary tool 10 are rotated and the clamp member 16 is not rotated, and the lower end faces of the hollow member 12, the pin member 14 and the clamp member 16 are held flush with each other as shown in FIG. 6(a), the hollow member 12, the pin member 14 and the clamp member 16 are moved downwards simultaneously with each other, so that their lower end faces are brought into contact with an upper surface of the upper metal sheet 8 as shown in FIG. 6(b). Then, while the stack 4 and the lower metal sheet 6 are integrally fixed or held together with a predetermined pressure applied with the clamp member 16 via the upper metal sheet 8, the hollow member 12 and the pin member 14 are moved in the same way as shown in FIGS. 2(a)-(d) and 3(a)-(c), whereby the metal mass 18 generated by the downward movement of the pin member 14 is accommodated within the space formed by the upward movement of the hollow member 12. Then, when the pin member 14 inserted into the lower metal sheet 6 is retracted, the hole formed by retraction of the pin member 14 is filled with the metal mass 18 pressed into the hole by the downward movement of the hollow member 12, whereby the weld 20 having the flat upper surface is effectively formed as shown in FIG. 7(c), as in the above-described embodiment shown in FIGS. 3(a)-(c), and a sound state of joining is realized.

Where the friction stir spot-welding operation according to the invention is performed by placing the upper metal sheet 8 on the stack 4, the stack 4 is pressed via the upper metal sheet 8, so that the problems such as tearing of the metal foils 2 can be more advantageously prevented, and a more sound state of the weld 20 is realized.

Further, in the friction stir spot-welding operation performed to join together the lower metal sheet 6, the stack 4 and the upper metal sheet 8 in the arrangement wherein the upper metal sheet 8 is placed on the stack 4 as described above, the lower end faces of the hollow member 12 and the pin member 14 of the double-acting type rotary tool 10 and the lower end face of the clamp member 16 fitted on the outer circumferential surface of the hollow member 12 are brought into contact with the upper surface of the upper metal sheet 8, while these lower end faces are held flush with each other, as shown in FIGS. 6(a) and 6(b), and then the friction stir spot-welding operation is performed, so that joining can be advantageously performed with a high degree of stability owing to a comparatively large area of contact, and an overflow of burr out of the clamp member 16 can be restricted.

While the typical embodiments of the invention have been described in detail for illustrative purpose only, it is to be understood that the invention is not limited to the details of the illustrated embodiments.

For example, it is possible to suitably employ various known structures of the double-acting type rotary tool 10 and the clamp member 16, and various known structures and mechanisms for rotation of the hollow member 12 and the pin member 14 about their axes and movements of the hollow member 12, the pin member 14 and the clamp member 16 in their axial directions.

Timings of the movements of the hollow member 12, the pin member 14 and the clamp member 16 in their axial directions are not limited to the above-described embodiments. The timings at which the hollow member 12 and the pin member 14 of the double-acting type rotary tool 10 are moved in their axial directions and rotated about their axes and the timing at which the clamp member 16 is moved in its axial direction may be suitably determined as far as the object of the invention can be achieved. In the friction stir spot-welding operation shown in FIGS. 6(*a*)-(*d*) and 7(*a*)-(*c*), for example, it is possible to initially move the clamp member 16 downwards before the double-acting type rotary tool 10 is moved downwards, so that the clamp member 16 is brought into contact with the upper metal sheet 8 to fix the upper metal sheet 8, the stack 4 and the lower metal sheet 6.

In the case where the upper metal sheet 8 is superposed on the stack 4 and the friction stir spot-welding operation is performed to join together the upper metal sheet 8, the stack 4 and the lower metal sheet 6, as shown in FIGS. 6(*a*)-(*d*) and 7(*a*)-(*c*), the upper metal sheet 8 and the lower metal sheet 6 may be formed as an integral member which is U-shaped in cross section, rather than the separate members, and the friction stir spot-welding operation according to the invention may be performed to join together the upper metal sheet 8, the stack 4 and the lower metal sheet 6, in an arrangement wherein the stack 4 is disposed within a space defined by the U-shaped integral member consisting of the upper and lower metal sheets 8 and 6.

It is to be understood that the invention may be embodied with various other changes, modifications and improvements, which are not illustrated herein and which may occur to those skilled in the art, without departing from the spirit of the invention, and that such changes, modifications and improvements are also within the scope of the invention.

EXAMPLES

To clarify the invention more specifically, typical examples of the invention will be described. It is to be understood that the invention is not limited to the details of the illustrated examples.

Initially, various kinds of metal foil (2), upper metal sheet (8) and lower metal sheet (6) were provided and combined as Examples 1 to 6 as shown in Table 1 given below. Each of the metal foil (2), upper metal sheet (8) and lower metal sheet (6) has a dimension of 80 mm×80 mm, and a stack (4) is constituted by 40 metal foils (2) superposed on each other.

TABLE 1

|  | Metal Foil (2) | | Upper Metal Sheet (8) | | Lower Metal Sheet (6) | |
|---|---|---|---|---|---|---|
|  | Material | Thickness (μm) | Number (sheets) | Material | Thickness (mm) | Material | Thickness: b (mm) |
| Example 1 | JIS A3003 Al Alloy | 50 | 40 | JIS A3003 Al Alloy | 0.3 | JIS A3003 Al Alloy | 2 |
| Example 2 | JIS A1200 Aluminum | 40 | 40 | — | — | JIS A3003 Al Alloy | 1 |
| Example 3 | JIS A8079 Al Alloy | 30 | 40 | — | — | JIS A3003 Al Alloy | 0.5 |
| Example 4 | Tough Pitch Copper | 15 | 40 | Tough Pitch Copper | 0.5 | Tough Pitch Copper | 2 |
| Example 5 | JIS A3003 Al Alloy | 50 | 40 | JIS A3003 Al Alloy | 0.3 | JIS A3003 Al Alloy | 2 |
| Example 6 | Tough Pitch Copper | 15 | 40 | Tough Pitch Copper | 0.5 | Tough Pitch Copper | 2 |

Then, each combination of the stack (4) of the metal foils (2), the upper metal sheet (8) and the lower metal sheet (6) of the Examples 1 to 6 was joined together by one of friction stir spot-welding operations A to D, as shown in Table 2 given below, by using one of rotary tools shown in Tables 2 and 3 given below. The operation A was performed as shown in FIGS. 6(*a*)-(*d*) and 7(*a*)-(*c*), and the operation B was performed as shown in FIGS. 2(*a*)-(*d*) and 3(*a*)-(*c*), while the operation C was performed as shown in FIG. 5. The operation D was performed by using a fixed type rotary tool in which a pin member (14) is formed integrally with a tool body (12) and a pin is provided so as to be coaxial with the tool body (12) and downwardly project from a lower end face of the tool body (12) by a length of 1.3 mm. The friction stir spot-welding operation in each Example was performed so as to give the ratio a/b of the depth "a" of insertion of the rotary tool (pin member, pin or hollow member) into the lower metal sheet (6), to the thickness "b" of the lower metal sheet (6), as shown in Table 2.

TABLE 2

| | Lower Metal Sheet (6) | | | |
|---|---|---|---|---|
| | Insertion Depth: a (mm) | a/b | Rotary Tool | Welding Operation |
| Example 1 | 0.1 | 0.05 | Double-acting Type | A |
| Example 2 | 0.5 | 0.5 | Double-acting Type | B |
| Example 3 | 0.2 | 0.4 | Double-acting Type | C |
| Example 4 | 0.3 | 0.15 | Double-acting Type | A |
| Example 5 | 0.1 | 0.05 | Fixed Type | D |
| Example 6 | 0.3 | 0.15 | Fixed Type | D |

TABLE 3

| Rotary Tool | Pin Member (14) or Pin | | Hollow Member or Tool Body (12) | | Clamp Member (16) | |
|---|---|---|---|---|---|---|
| | Diameter (mm) | Rotational Frequency (rpm) | Outside Diameter (mm) | Rotational Frequency (rpm) | Outside Diameter (mm) | Rotational Frequency (rpm) |
| Double-acting Type | 3 | 2160 | 6 | 2160 | 15 | Not Rotated |
| Fixed Type | 3 (Projection Length 1.3 mm) | 1000 | 8 | 1000 | — | — |

As a result of performing the various kinds of friction stir spot-welding operation described above, it was confirmed that in the Examples 1 to 4, wherein the friction stir spot-welding operation was performed according to the invention by using the double-acting type rotary tools and the clamp member (16), there were obtained joined bodies which have a sound state of joining and which do not suffer from displacement of the metal foils (2) relative to each other and formation of a tool hole such as a pin hole. On the other hand, it was confirmed that joined bodies obtained in the Examples 5 and 6 by using the fixed type rotary tool suffered from displacement of the metal foils (2) relative to each other, formation of the pin hole (tool hole), and formation of burr derived from a metal mass generated during the friction stir spot-welding operation, so that a desired quality of the weld could not be achieved.

The invention claimed is:

1. A process for spot-joining stacked metal foils by a friction stir spot-welding operation, the process comprising placing a stack of 10 to 100 metal foils superposed on each other on a lower metal sheet, wherein each of the metal foils has a thickness of 3 μm to 50 μm, and a rotary tool rotated about its axis is inserted through the stack into the lower metal sheet, whereby the stack and the lower metal sheet are friction-stirred and joined integrally with each other, wherein:

the rotary tool is a double-acting type rotary tool comprising: a hollow member which has an end face perpendicular to its axis and which is movable in its axial direction; and a pin member which is disposed coaxially within the hollow member, formed independently of the hollow member, and movable in its axial direction independently of the hollow member;

a cylindrical clamp member which is movable in its axial direction is fitted on an outer circumferential surface of the hollow member so as to be coaxial with the hollow member;

the friction stir spot-welding operation is performed by holding the clamp member in pressing contact with an outer annular part of a portion to be friction-stirred, and advancing either one of the hollow member and the pin member of the double-acting type rotary tool into the portion to be friction-stirred, while retracting the other of the hollow member and the pin member, so that a space is formed between the portion to be friction-stirred and said other of the hollow member and the pin member, whereby a metal mass is generated by insertion of said one of the hollow member and the pin member into the portion to be friction-stirred, and is accommodated within said space; and subsequently to the friction stir spot-welding operation, said other of the hollow member and the pin member is advanced, while said one of the hollow member and the pin member is retracted, so that the metal mass accommodated within said space is pressed by said other of the hollow member and the pin member, into a hole formed by retraction of said one of the hollow member and the pin member, whereby the hole is filled with the metal mass.

2. The process for spot-joining stacked metal foils according to claim 1, wherein after a portion of the stack to be friction-stirred is fixed with the clamp member which is held in pressing contact with an outer annular part of said portion of the stack, the hollow member and the pin member of the double-acting type rotary tool are brought into contact with said portion of the stack to be friction-stirred, while end faces of the hollow member and the pin member are held flush with each other, and then, said one of the hollow member and the pin member is advanced and said other of the hollow member and the pin member is retracted, simultaneously with each other.

3. The process for spot-joining stacked metal foils according to claim 1, wherein an upper metal sheet is superposed on the stack, and the friction stir spot-welding operation is performed by inserting the rotary tool through the upper metal sheet and through the stack into the lower metal sheet, to join together the stack and the upper and lower metal sheets.

4. The process for spot-joining stacked metal foils according to claim 3, wherein while end faces of the hollow member, the pin member and the clamp member are held flush with each other, the hollow member and the pin member of the double-acting type rotary tool are brought into contact with a portion of the upper metal sheet corresponding to a portion of the stack to be friction-stirred, and the clamp member is brought into contact with an outer annular part of said portion of the upper metal sheet, and then, said one of the hollow member and the pin member is advanced and said other of the hollow member and the pin member is retracted, simultaneously with each other, while said portion of the upper metal sheet is fixed with the clamp member which is held in pressing contact with the outer annular part of said portion of the upper metal sheet.

5. The process for spot-joining stacked metal foils according to claim 1, wherein the friction stir spot-welding operation is performed so as to satisfy formulas $0.01 \leq a \leq 0.75 \times b$, and $0.2 \leq b$, in which "a" (mm) is a depth of insertion of said one of the hollow member and the pin member into the lower metal sheet, and "b" (mm) is a thickness of the lower metal sheet.

6. The process for spot-joining stacked metal foils according to claim 1, wherein the metal foils are aluminum foils or copper foils.

7. The process for spot-joining stacked metal foils according to claim 1, wherein the lower metal sheet has a thickness of 0.2-3 mm.

8. The process for spot-joining stacked metal foils according to claim 3, wherein the upper metal sheet has a thickness of 0.1-1 mm.

* * * * *